United States Patent
Lee

(10) Patent No.: US 7,447,257 B2
(45) Date of Patent: Nov. 4, 2008

(54) APPARATUS AND METHOD FOR ALLOCATING SEARCH RESOURCE OF BASE STATION MODEM

(75) Inventor: Kyung Ho Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 10/746,535

(22) Filed: Dec. 23, 2003

(65) Prior Publication Data

US 2004/0151233 A1    Aug. 5, 2004

(30) Foreign Application Priority Data

Dec. 31, 2002   (KR)   ...................... 10-2002-0088426

(51) Int. Cl.
   *H04B 1/00*   (2006.01)
(52) U.S. Cl. .................. 375/148; 455/403; 455/441; 455/442; 455/450; 455/456.6
(58) Field of Classification Search ................ 375/148; 455/403, 435
   See application file for complete search history.

(56) References Cited

U.S. PATENT DOCUMENTS

| | | | |
|---|---|---|---|
| 6,160,511 A * | 12/2000 | Pfeil et al. | 342/457 |
| 6,278,725 B1 * | 8/2001 | Rouphael et al. | 375/148 |
| 6,288,674 B1 * | 9/2001 | Sengupta et al. | 342/418 |
| 6,304,620 B1 * | 10/2001 | Rouphael | 375/344 |
| 6,389,295 B1 * | 5/2002 | Ramesh | 455/517 |
| 6,606,496 B1 * | 8/2003 | Salvarani et al. | 455/436 |
| 6,697,348 B1 * | 2/2004 | Chen et al. | 370/337 |
| 6,934,320 B2 * | 8/2005 | Tujkovic et al. | 375/146 |
| 7,072,677 B2 * | 7/2006 | Kim et al. | 455/509 |
| 7,089,004 B2 * | 8/2006 | Jeong et al. | 455/436 |
| 7,146,167 B2 * | 12/2006 | Tanabe | 455/436 |
| 7,197,304 B2 * | 3/2007 | Chung et al. | 455/424 |
| 2002/0018487 A1 * | 2/2002 | Chen et al. | 370/465 |
| 2003/0027574 A1 * | 2/2003 | Watanabe et al. | 455/435 |
| 2003/0109265 A1 * | 6/2003 | Yamamoto et al. | 455/456 |
| 2003/0119509 A1 * | 6/2003 | Yun | 455/436 |
| 2004/0023634 A1 * | 2/2004 | Jeong et al. | 455/403 |
| 2005/0018641 A1 * | 1/2005 | Zhao et al. | 370/342 |
| 2005/0078740 A1 * | 4/2005 | Xu et al. | 375/148 |

FOREIGN PATENT DOCUMENTS

JP       2000-083010        3/2000

* cited by examiner

*Primary Examiner*—David C. Payne
*Assistant Examiner*—Adolf Dsouza
(74) *Attorney, Agent, or Firm*—Lee, Hong, Degerman, Kang & Schmadeka

(57) ABSTRACT

A system and method for allocating a search resource of a base station modem is provided. The system comprises search controlling units for receiving an allocated search resource and searching a multi-path of a radio channel to produce a search result; measuring units for measuring mobility of a terminal based on the search result; and allocating units for adaptively allocating a common search resource to the search controlling units based on a measure of mobility of the terminal.

13 Claims, 3 Drawing Sheets

APPARATUS AND METHOD FOR ALLOCATING SEARCH RESOURCE OF BASE STATION MODEM

CROSS REFERENCE TO RELATED APPLICATION

Pursuant to 35 U.S.C. § 119(a), this application claims the benefit of earlier filing date and right of priority to Korean Patent Application No. 2002-88426, filed on Dec. 31, 2002, the content of which is hereby incorporated by reference herein in its entirety.

BACKGROUND OF THE INVENTION

1. Field of the Invention

The present invention relates to a base station modem and, more particularly, to a system and method for allocating a search resource of a base station modem capable of providing different search service according to mobility of a terminal.

2. Description of the Background Art

FIG. 1 illustrates a block diagram of components of a related art apparatus for allocating a search resource of a base station modem. As shown in FIG. 1, a common searching unit 10 includes a plurality of common search hardware resources, that is, a plurality of correlators, which are able to search certain-sized chips in parallel. Because the plural correlators are the common search HW resources, the common search HW resources are separately allocated to plural search controllers 20-1~20-n.

The plural search controllers 20-1~20-n search multi-path of a radio channel. Then, a plurality of rake receivers 30-1~30-n receive each search result from the search controllers 20-1~20-n and demodulate a receiving data by combining multi-path signals on a communication link. In this manner, in the base station modem receiver for plural users, the common search HW resources are evenly divided and periodically provide the search service to the N number of rake receivers.

However, in a radio environment except for a special case, a probability that N number of terminals are in rapid movement or stationary is very low. And, a probability that each terminal has a different mobility is very high. Therefore, in the case that the search resource is evenly distributed to the rake receivers, a rake receiver which processes a signal of a terminal in a moving state is short of the search service. A rake receiver which processes a signal of a terminal in a stop state receives an excessive search resource.

As a result, the terminal in a high mobility fails to be provided a service for a multi-path distribution changed quickly due to the shortage of the search service of the rake receiver, resulting in degradation of a quality in a call communication and increase of a call disconnection rate. A system and method is needed to overcome the above-stated shortcomings associated with the current state of the technology.

SUMMARY OF THE INVENTION

An object of the present invention is to provide a system and method for allocating a search resource of a base station modem that are capable of dynamically allocating a common search resource according to mobility of a terminal.

In accordance with one or more embodiments, an apparatus for allocating a search resource of a base station modem comprises a plurality of search controllers for receiving an allocated search resource and searching a multi-path of a radio channel to produce a search result; a plurality of rake receiver for measuring mobility of a terminal based on the search result; and a common search resource allocating unit for adaptively allocating a common search resource to the plurality of search controllers based on a measure of mobility of the terminal.

The plurality of rake receivers comprise a plurality of mobility measuring units for measuring mobility of the terminal by counting number of level crossings of at least one finger for a predetermined time. At least one mobility measuring unit measures mobility of a terminal. The common search resource allocating unit allocates an initial fixed resource, a portion of the common search resource, to the plurality of search controllers for measurement of mobility of the terminal. The common search resource allocating unit adaptively allocates the common search resource.

In another embodiment, a method for allocating a search resource of a base station modem comprises allocating an initial fixed resource to a rake receiver; demodulating a multipath signal from the allocated initial fixed resource and measuring mobility of a terminal; and adaptively allocating a common search resource to the rake receiver based on the mobility of the terminal. The initial fixed resource is a portion of the common search resource. The mobility of the terminal is measured and the common search resource is adaptively allocated.

The rake receiver receiving a terminal signal with a high mobility is allocated a maximum number of common search resources. The rake receiver receiving a terminal signal with a low mobility is allocated a minimum number of common search resources. The rake receiver receiving a terminal signal in a stop state is allocated a minimum number of common search resource.

In accordance with yet anther embodiment, a system for allocating a search resource of a base station modem comprises search controlling means for receiving an allocated search resource and searching a multi-path of a radio channel to produce a search result; measuring means for measuring mobility of a terminal based on the search result; and allocating means for adaptively allocating a common search resource to the search controlling means based on a measure of mobility of the terminal.

The measuring means comprise mobility measuring means for measuring mobility of the terminal by counting number of level crossings of at least one finger for a predetermined time. At least one mobility measuring means measures mobility of a terminal and the allocating means allocates an initial fixed resource to the controlling means for measurement of mobility of the terminal.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
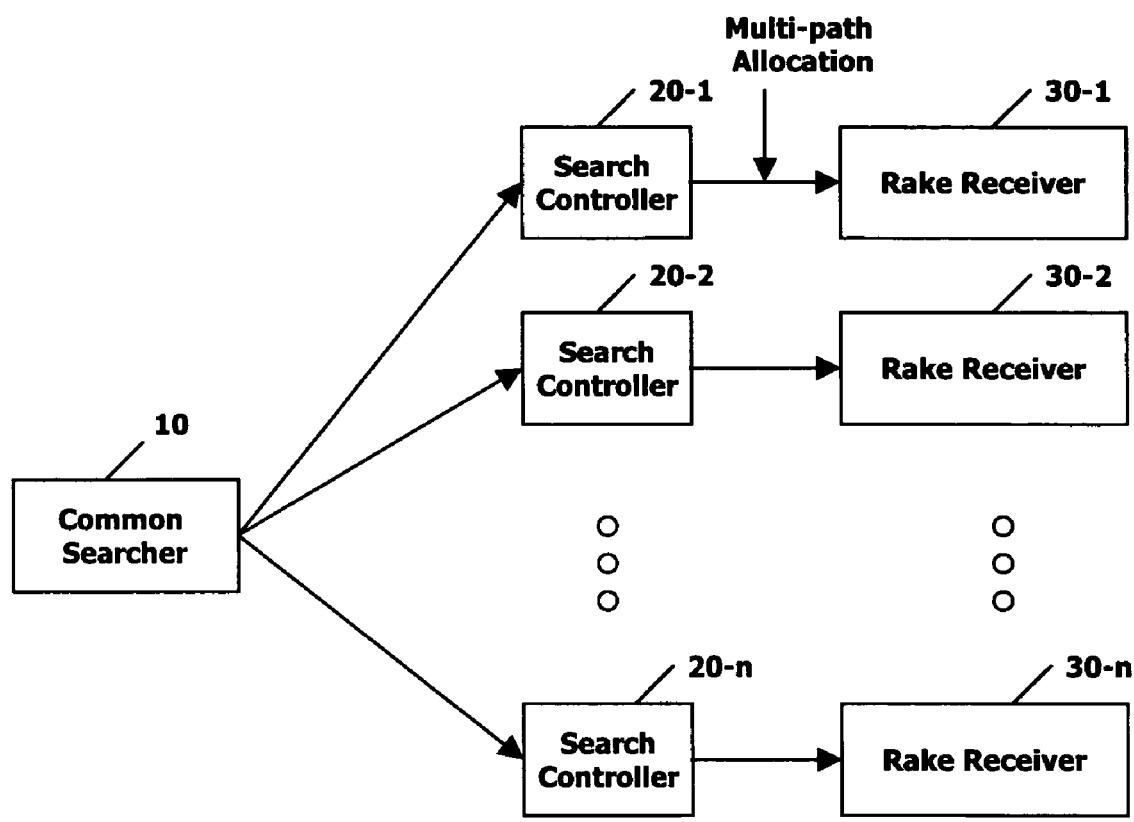
FIG. 1 illustrates a block diagram of an apparatus for allocating a search resource of a base station modem in accordance with related art.
Figure 2:
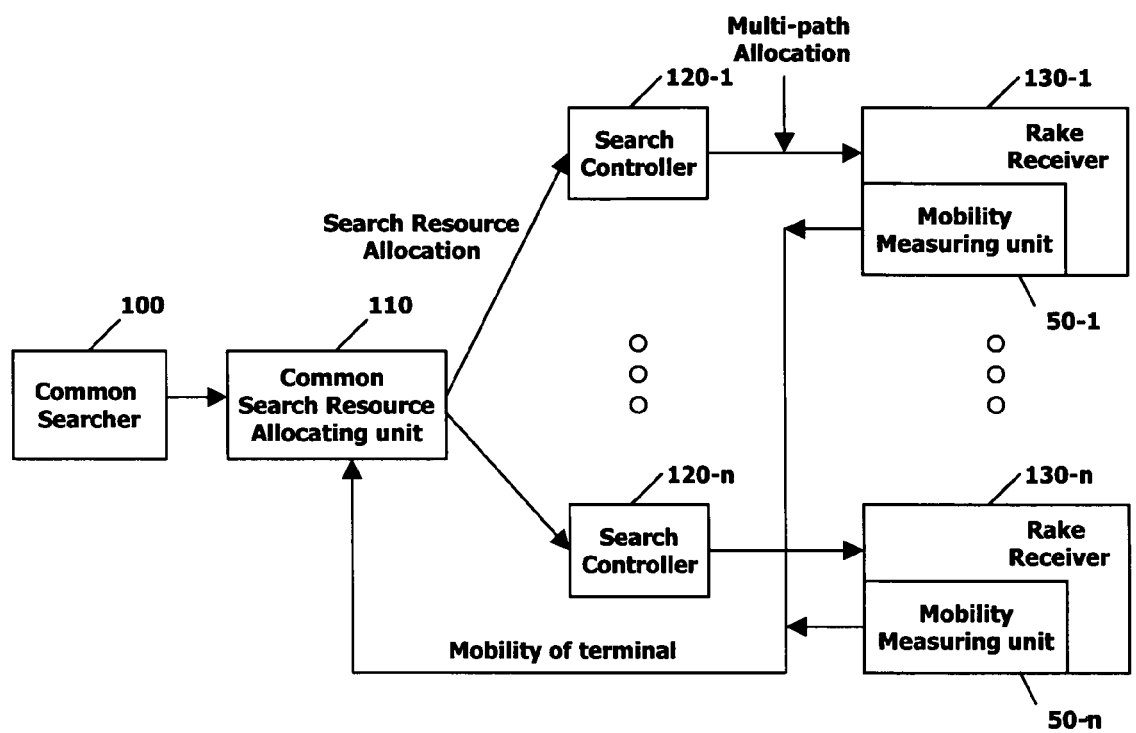
FIG. 2 illustrates a block diagram of an apparatus for allocating a search resource of a base station modem in accordance with a preferred embodiment of the present invention.

The present invention provides a method in which mobility of a mobile communication terminal (hereafter terminal) is measured and then a search resource is adaptively allocated according to the measured mobility of the terminal. Referring to FIG. 2, in accordance with one embodiment, a search resource allocating apparatus comprises a common searching unit 100, a common search resource allocating unit 110, a plurality of search controllers 120 1~120-n, and a plurality of rake receivers 130-1~130-n.

The common search resource allocating unit 110 discriminates a common search resource on the basis of mobility information of a terminal and allocates the common search resources to the search controllers 120-1~120-n, for example. Each of the rake receivers 130-1~130-n comprises a mobility measuring unit 50-1~50-n for demodulating a terminal signal, counting the number of level crossings of each finger for a predetermined time and measuring mobility of the terminal. The measured mobility information is fed back to the common search resource allocating unit 110 and used for dynamic allocation of a search resource.

The operation for dynamically allocating a search resource according to mobility of a terminal in the apparatus for allocating a search resource of a base station modem constructed as described above will now be described with reference to the accompanying drawings. The common search resource allocating unit 110 allocates a plurality of common search resources provided from the common searching unit 100 on the basis of the mobility information.

The common search resource comprises a set of correlators. Each correlator can achieve the initial synchronization of a terminal signal by obtaining high correlation energies. A certain portion of the common search resource is allocated as an initial fixed resource to search controllers 120-1~120-n to which a call is newly allocated.

Figure 3:
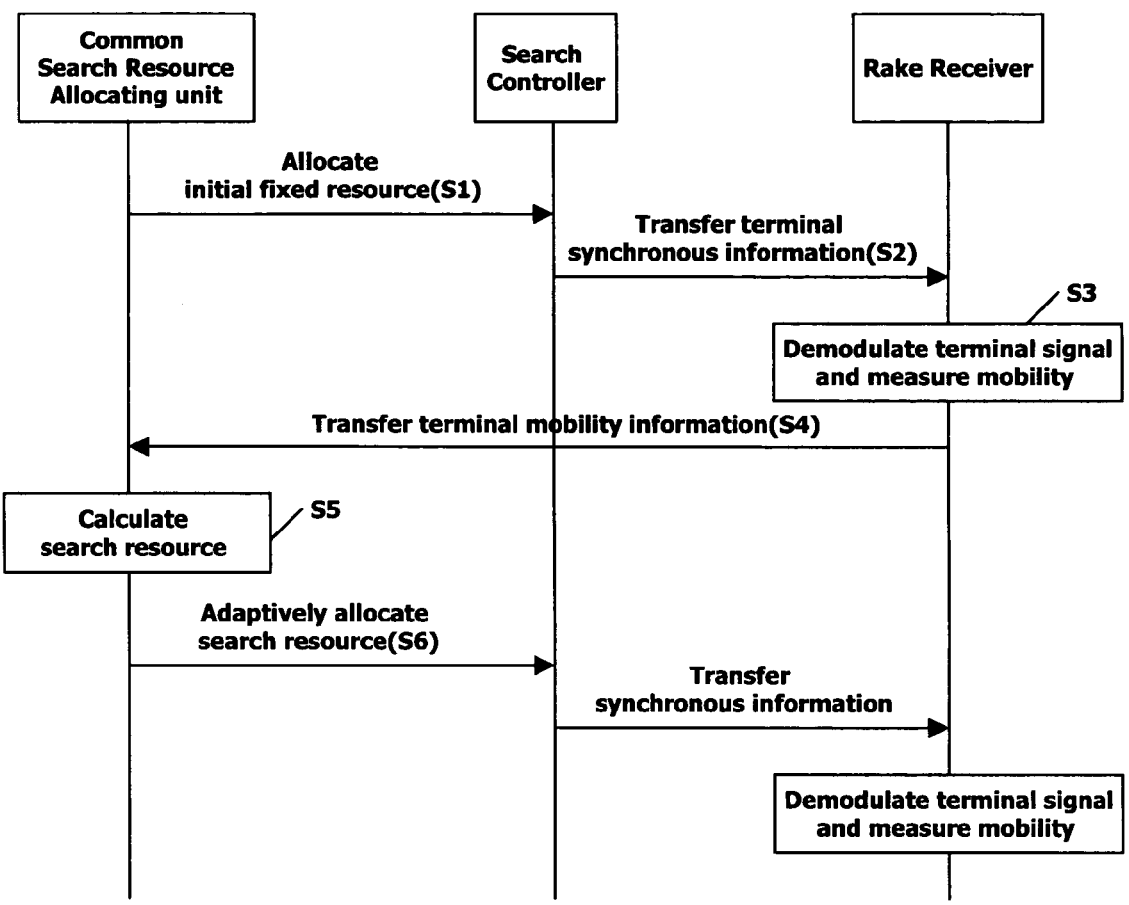
FIG. 3 is a flow diagram of a method for adaptively allocating a common search resource according to mobility of a terminal in a base station modem receiver of FIG. 2, in accordance with one or more embodiments.

Referring to FIG. 3, the common search resource allocating unit 110 allocates the initial fixed resource, a portion of the plural common search unit 110 allocates the initial fixed resource, a portion of the plural common search resources (correlators), to the plural search controllers 120-1~120-n (step S1). Upon receiving the initial fixed resource, the search controllers 120-1~120-n search a multi-path of a radio channel and outputs a search result to the plural rake receivers 130-1~130-n.

In addition, the search controllers constitute a parallel searching unit with the allocated initial fixed resource, for example. That is, the allocated correlator searches a start point of an initial PN (Pseudonoise) code of a terminal. The start point of the PN code is transferred as synchronous information of the corresponding terminal to the rake receiver (step S2).

The plural rake receivers 130-1~130-n receive the search result from the search controllers 120-1~120-n through fingers, demodulates receiving data on the multi-path on the basis of the synchronous signal, and measure mobility of the terminal by using a mobility measuring unit (step S3). In this respect, if the base station receives a signal of a moving terminal, a reception level of the finger of the rake receiver is sharply changed due to a Doppler shift and changing wireless environment, and the finger is frequently replaced due to the Doppler shift.

In one embodiment of the present invention, mobility of the terminal is measured by counting level crossings of the terminal signal, for which the number of level crossings of each finger and a weight value of the number of replaced fingers are used, for example. Accordingly, the mobility measuring units 50-1~50-n count how many times each finger level-crosses target SNRs (Signal-to-Noise Ratio) for T seconds to measure mobility of the terminal. Mobility of the terminal, in one embodiment, is defined by Equation 1, provided below:

$$\text{Mobility} = \frac{Lc * W + Rc(1 - W)}{T} \quad \text{(Equation 1)}$$

Lc indicates, for example, the number of average level crossings by fingers measured for T seconds. Rc indicates the number of replaced fingers measured for T seconds, 'W' indicates weight values of the number of level crossings of each finger and the number of replaced fingers. Relationships, K<Lc, Rc<T, and 'K' indicate a minimum resource allocated to the terminal in a stop state.

That is, if a terminal has a low mobility or is in a stop state, minimum searcher resource would be distributed to the terminal. Thus, by distributing a minimum search resource (K) to a rake receiver processing a signal of such a terminal the low mobility or in the stop state, a call disconnection rate can be prevented. When T seconds elapses, the mobility information measured by the N number of rake receivers 130-1~130-n in service is fed back to the common search resource allocating unit 110 (step S4).

In certain embodiments, the common search resource allocating unit 110 calculates search resources by using the terminal mobility information received form the plural rake receivers 130-1~130-n and adaptively allocates the calculated search resources to the search controllers 120-1~120-n (steps S5 and S6). The allocation of search resource in a preferred embodiment is performed according to Equation 2, provided below:

$$\text{Allocation} = \frac{\text{mobility}(k)}{\sum_{t=1}^{N} \text{mobility}(l)} * M \quad \text{(Equation 2)}$$

Mobility (k) is a level crossing value of the $k^{th}$ rake receiver among the N number of rake receivers. 'M' is the size of a remaining portion of the resource after the initial resource is allocated, for example. The common search resource allocating unit 110 adaptively allocates the search resource according to mobility of the terminal, so that a rake receiver processing a signal of a terminal moving fast is allocated more search resources while a rake receiver in a stop state is allocated a minimum search resource. In some embodiments of the invention, the common search resource allocating unit 110 is separately implemented, and can be provided in the common searcher 100, for example.

As such, in accordance with one or more embodiments, more search resources are allocated to the rake receiver for a terminal which moves fast. Thus, based on the mobility of the terminal, a search time for the terminal with the high mobility can be reduced, and the sharply changed multi-path pattern of the terminal can be promptly tracked. Consequently, a probability that the terminal with high mobility loses the multi-path is reduced. In addition, because a minimum resource is distributed to the terminal in the stop state, the multi-path is allocated more efficiently so that call disconnection rate for a terminal with a low mobility or in a stop state can be improved.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. An apparatus for allocating a search resource of a base station modem comprising:
    a plurality of search controllers for receiving an allocated search resource and searching a multi-path of a radio channel to produce a search result;
    a plurality of rake receiver for measuring mobility of a terminal based on the search result; and
    a common search resource allocating unit for adaptively allocating a common search resource to the plurality of search controllers based on a measure of mobility of the terminal,
    wherein each rake receiver in said plurality of rake receivers comprises a mobility measuring unit for measuring mobility of the terminal,
    wherein at least one mobility measuring unit measures mobility of a terminal as $$\frac{Lc*W + Rc(1-W)}{T},$$

wherein Lc indicates number of average level crossings by at least one finger measured for T seconds, Rc indicates number of replaced fingers measured for T seconds, and W indicates weight values of number of level crossings for each finger and number of replaced fingers.

2. The apparatus of claim 1, wherein the measuring units measure the mobility of the terminal by counting number of level crossings of at least one finger for a predetermined time.

3. The apparatus of claim 1, wherein the common search resource allocating unit allocates an initial fixed resource, a portion of the common search resource, to the plurality of search controllers for measurement of mobility of the terminal.

4. The apparatus of claim 1, wherein the common search resource allocating unit adaptively allocates the common search resource based on $$\frac{\text{mobility}(k)}{\sum_{t=1}^{N} \text{mobility}(l)} * M,$$

wherein mobility (k) is a level crossing value of $k^{th}$ rake receiver among N number of rake receivers, and M is size of a remaining portion of a second resource after a first resource is allocated.

5. A method for allocating a search resource of a base station modem comprising:
    allocating an initial fixed resource to a rake receiver;
    demodulating a multi-path signal from the allocated initial fixed resource and measuring mobility of a terminal; and
    adaptively allocating a common search resource to the rake receiver based on the mobility of the terminal,
    wherein the mobility of the terminal is measured as $$\frac{Lc*W + Rc(1-W)}{T},$$

wherein Lc indicates the number of average level crossings by at least one finger measured for T seconds, Rc indicates number of replaced fingers measured for T seconds, W indicates weight values of number of level crossings of each finger and number of replaced fingers.

6. The method of claim 5, wherein the initial fixed resource is a portion of the common search resource.

7. The method of claim 5, wherein the common search resource is adaptively allocated based on $$\frac{\text{mobility}(k)}{\sum_{t=1}^{N} \text{mobility}(l)} * M,$$

wherein mobility (k) is a level crossing value of a $k^{th}$ rake receiver among N number of rake receivers, and M is size of a remaining portion, after the initial resource is allocated.

8. The method of claim 5, wherein the rake receiver receiving a terminal signal with a high mobility is allocated a maximum number of common search resources.

9. The method of claim 5, wherein the rake receiver receiving a terminal signal with a low mobility is allocated a minimum number of common search resources.

10. The method of claim 5, wherein the rake receiver receiving a terminal signal in a stop state is allocated a minimum number of common search resource.

11. A system for allocating a search resource of a base station modem, the system comprising:
    search controlling unit for receiving an allocated search resource and searching a multi-path of a radio channel to produce a search result;
    measuring unit for measuring mobility of a terminal based on the search result, wherein the measuring unit is within a rake receiver unit; and
    allocating unit for adaptively allocating a common search resource to the search controlling means based on a measure of mobility of the terminal, wherein at least one mobility measuring means measures mobility of a terminal as $$\frac{Lc*W + Rc(1-W)}{T},$$

wherein Lc indicates number of average level crossings by at least one finger measured for T seconds, Re indicates number of replaced fingers measured for T seconds, and W indicates weight values of number of level crossings for each finger and number of replaced fingers.

12. The system of claim 11, wherein the measuring means comprises mobility measuring means for measuring mobility of the terminal by counting number of level crossings of at least one finger for a predetermined time.

13. The system of claim 11, wherein the allocating means allocates an initial fixed resource to the controlling means for measurement of mobility of the terminal.

* * * * *